(12) United States Patent
Schiele et al.

(10) Patent No.: US 7,704,188 B2
(45) Date of Patent: Apr. 27, 2010

(54) METHOD FOR THE OPERATION OF A TRANSMISSION DEVICE WITH SEVERAL HYDRAULICALLY ACTUATED SHIFT ELEMENTS

(75) Inventors: Peter Schiele, Kressbronn (DE); Klaus Steinhauser, Kressbronn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 370 days.

(21) Appl. No.: 11/851,037

(22) Filed: Sep. 6, 2007

(65) Prior Publication Data
US 2008/0064547 A1 Mar. 13, 2008

(30) Foreign Application Priority Data
Sep. 7, 2006 (DE) ................. 10 2006 041 900

(51) Int. Cl.
*B60W 10/04* (2006.01)
(52) U.S. Cl. ..................................... 477/115
(58) Field of Classification Search ........................ None
See application file for complete search history.

(56) References Cited

U.S. PATENT DOCUMENTS

| 5,316,116 A | 5/1994 | Slicker et al. |
| 5,794,734 A | 8/1998 | Fahl et al. |
| 2008/0293544 A1 * | 11/2008 | Schiele et al. ............... 477/164 |

FOREIGN PATENT DOCUMENTS

| DE | 43 23 133 A1 | 1/1994 |
| DE | 43 33 564 A1 | 4/1995 |
| DE | 693 09 004 T2 | 10/1997 |
| DE | 199 23 154 A1 | 11/1999 |
| DE | 199 61 796 C1 | 9/2001 |
| DE | 101 28 867 A1 | 12/2002 |
| DE | 10 2006 014 756.1 | 3/2008 |
| EP | 1 679 456 A1 | 1/2005 |
| GB | 2 339 606 A | 2/2000 |
| JP | 2002-106380 | 4/2002 |

\* cited by examiner

*Primary Examiner*—Dirk Wright
(74) *Attorney, Agent, or Firm*—Davis & Bujold, P.L.L.C.

(57) ABSTRACT

A method is described for the operation of a transmission device (3) with several shift elements (5, 6) actuated hydraulically by a pressure source (4) for engaging and disengaging various transmission ratios and with several electric actors (7, 8) of a hydraulic system of the transmission device (3) for the adjustment of actuating pressures for the shift elements (5, 6). When an engine start-stop function calls for a combustion engine (2) of a drivetrain comprising the transmission device (3) to be switched off, the energizing current of the actors (7, 8) is adjusted from an operating level (I_B) in which the respective actors (7, 8) are energized with a current appropriate for producing an operating-situation-dependent actuation pressure in the shift elements (5, 6), to a standby level (I_S). When the engine start-stop function calls for the combustion engine (3) to be switched on, the energizing current of the actors (7, 8) is adjusted from the standby level (I_S) to the operating level (I_B). The energizing currents of the actors (7, 8) are changed from the standby level (I_S) to the operating level (I_B) in a defined time sequence.

6 Claims, 2 Drawing Sheets

METHOD FOR THE OPERATION OF A TRANSMISSION DEVICE WITH SEVERAL HYDRAULICALLY ACTUATED SHIFT ELEMENTS

This application claims priority from German Application Serial No. 10 2006 041 900.6 filed Sep. 7, 2006.

FIELD OF THE INVENTION

The invention concerns a method for operating a transmission device with several hydraulically actuated shift elements.

BACKGROUND OF THE INVENTION

In order to reduce the fuel consumption and the output of pollutant emissions of vehicles built with combustion engines and familiar from general practice, it has become common to switch off the combustion engines of vehicles under appropriate operating conditions of the vehicle with the help of various vehicle concepts. Such functions are known among other things as engine stop-start functions, which are activated or deactivated depending on the operating conditions of the most varied vehicle components, and trigger the switching off of the combustion engine even when the vehicle is briefly at rest.

So that conventional driving operation is not compromised by an engine start-stop function, if a driver wishes to drive on so that the vehicle's combustion engine has to be started, particularly when entering a congested street with a right of way, it is necessary to have a quick engine starting process and an immediate build-up of the force flow in a transmission device of the vehicle. In conventionally made automatic transmissions or automated shift transmissions constructed with shift elements made as wet-running disk clutches for engagement and disengagement of various transmission ratio steps of the transmission device, the shift elements are essentially supplied with the required control pressure from a transmission pump only when the combustion engine is running. In this, the control pressure or an actuating pressure of a shift element is in each case adjusted by way of at least one electric actor.

For the build-up of the force flow in the transmission, an air gap of a shift element to be actuated first has to be closed and then the shift element to be actuated is fully engaged by increasing the actuating pressure in accordance with predetermined engagement characteristics. Closing the air cap in a shift element and then engaging it in the force flow of a transmission are both carried out by passing a certain hydraulic fluid volume flow into a piston space of the hydraulically controlled clutch to be engaged, and this has to be supplied by the transmission pump driven by the started combustion engine.

If, before the vehicle is re-started, several shift elements of a transmission are open because the combustion engine is switched off and these have to be closed for the vehicle to re-start, the time between the beginning of the combustion engine's starting process and the time when the force flow in the transmission has been fully established is prolonged sometimes to such an extent that a vehicle made with an engine start-stop function cannot be operated as effectively as desired.

For vehicles with conventional transmissions having an implemented engine start-stop function to be able, despite this, to be operated in the desired manner, in some vehicles known as such, besides the main transmission pump a further hydraulic pump driven by an electric motor is provided, whose delivery volume is independent of the speed of the combustion engine and which, if insufficient pressure is supplied by the main transmission pump of the transmission unit, produces a pressure in the hydraulic system, in collaboration with the electric actors of the transmission unit, for the shift elements to be actuated at least sufficient to close the respective air gaps in the shift elements to be engaged in order to establish the force flow in the transmission unit.

Unfortunately, compared with transmission devices having no additional pump, the above-described design of a transmission with a main transmission pump driven by the Combustion engine and an additional pump driven by an electric motor reduces the efficiency of the transmission and increase its manufacturing costs.

Measures which improve the transmission efficiency only slightly and increase manufacturing costs only by a small amount, in order to be able to operate a vehicle that works with an engine start-stop function with the desired spontaneity, are known from DE 10 2006 014 756.1. For the sufficient supply of a transmission device when a combustion engine is to be switched on, a device for storing hydraulic fluid of a hydraulic system of a transmission device and a method for the operation of such a device are proposed, the device or hydraulic storage unit being made as a spring-loaded oil volume store with an electro-mechanical detent system.

While the combustion engine is switched on, the hydraulic storage device is filled by a hydraulic pressure produced by a main transmission pump so that as the hydraulic storage device fills up a piston, of the hydraulic storage device, is moved to a position in which it can be arrested and held by a holding device When the combustion engine is switched off so that the drive power to the main transmission pump is zero, the hydraulic pressure in the hydraulic system of the transmission device falls essentially to zero. If an engine start-stop function then calls for the combustion engine to be switched on, then the production of the force flow in the transmission unit is supported in a simple manner by expelling the volume of hydraulic fluid stored in the hydraulic storage device during a starting process of the combustion engine.

Furthermore, when the unpressurized condition in the hydraulic system of the transmission device brought about by switching off the combustion engine has been reached, the electric actors are energized to a so-termed standby level in which only so-termed diagnosis functions can be carried out by the actors in the transmission device and in which the electric power uptake of the transmission is minimized, so that the vehicle's electric power supply system is relieved to a not inconsiderable extent. Moreover, when the engine start-stop function calls for the combustion engine to be switched on or when it is recognized that the combustion engine has been started up from the standby level to an operating level in which the actors are respectively energized with a current corresponding to a required operating condition such as the engagement of a gear, a neutral operating condition, or a parking operation, the energizing current of the actors is changed. By changing the energizing current of the actors from the standby level to the operating level, the shift elements to be engaged, in order to produce the desired operating condition of the transmission unit, are at the same time acted upon and filled with hydraulic fluid from the hydraulic system of the transmission unit.

The sequence in which the respective shift elements reach their transmission capacity required for producing the operating condition of the transmission device called for, depends essentially on the filling flow resistance in the lines of the hydraulic system and on the clutch volumes to be filled.

During a starting process of a combustion engine, these dependencies sometimes result in undesired operating condition variations within the transmission unit, in which rotating masses inside the transmission are first accelerated and then synchronized and undesirably braked by the shift element when it eventually reaches its intended transmission capacity. This results in undefined rotation speed conditions in the transmission, with the consequence of non-reproducible behavior and which sometimes causes a jerk in the drive train that reduces driving comfort.

Accordingly, the purpose of the present invention is to provide a method for operating a transmission device, which avoids compromising the driving comfort of a vehicle.

SUMMARY OF THE INVENTION

In the method according to the invention for operating a transmission unit with several shift elements that can be actuated hydraulically by a pressures source to engage and disengage various transmission ratios, and with several electric actors of a hydraulic system of the transmission unit for producing actuating pressures for the shift elements, when an engine start-stop function calls for the switching off of a combustion engine of a drivetrain comprising the transmission device from an operating level in which the respective actors are energized with a current corresponding to an operating-condition-dependent actuation pressure of the shift elements, the energizing current of the actors is adjusted to a standby level, and when the engine start-stop function calls for the combustion engine to be switched on from the standby level to the operating level, it is adjusted in the opposite sense.

According to the invention the energizing current of the actor, starting from the standby level to the operating level, is changed in a defined sequence, which also results in a defined sequence in which the shift elements involved in producing a required operating condition of the transmission unit reach their intended transmission capacities so that, compared with conventionally operated transmissions, rotating mass effects during the switching on of the combustion engine or torque fluctuations that can be felt by a driver via a transmission output, are minimized to an extent that increases driving comfort.

This means that the energizing current of the electric actors is changed from the standby level to the operating level in sequence in such a manner that the acceleration of rotating transmission masses and the subsequent braking of those transmission masses are avoided or at least minimized.

BRIEF DESCRIPTION OF THE DRAWINGS

The invention will now be described, by way of example, with reference to the accompanying drawings in which.

DETAILED DESCRIPTION OF THE INVENTION

Figure 1:
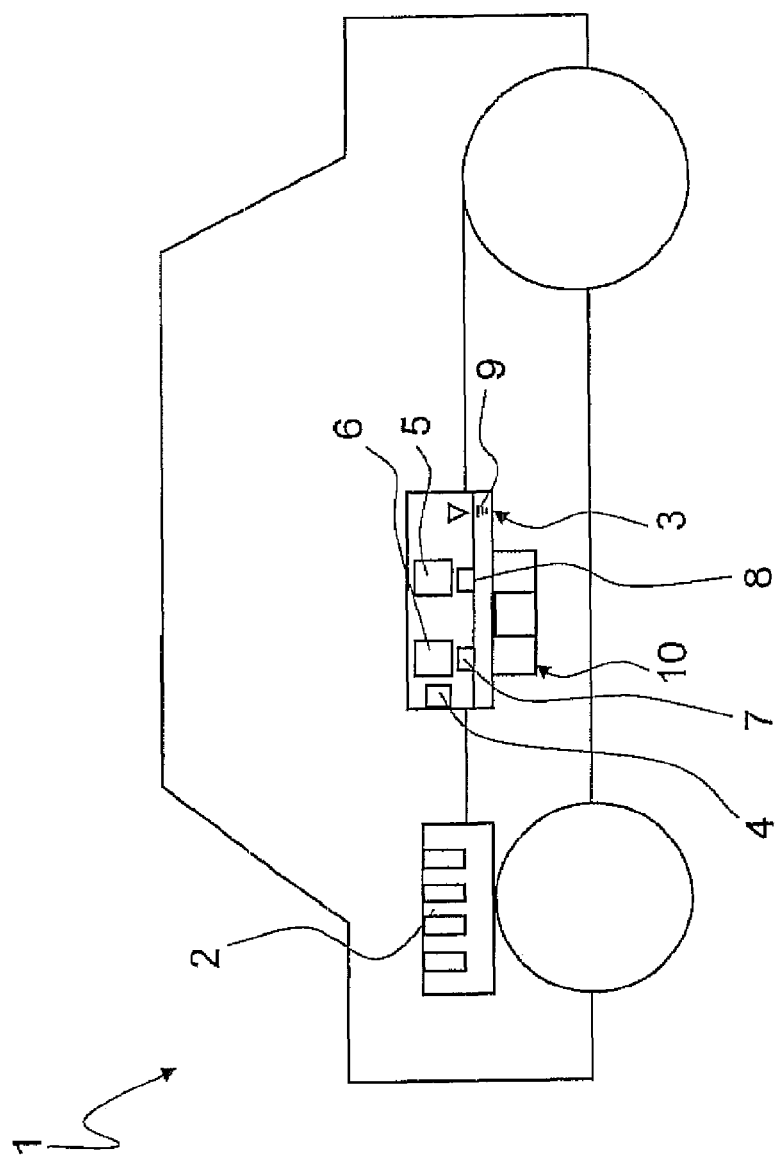
FIG. 1 is a schematic representation of a vehicle with a drivetrain comprising a transmission unit and a combustion engine.

FIG. 1 shows a vehicle 1 with a combustion engine 2 and a transmission device 3 with several shift elements 5, 6 that can be acted upon by hydraulic pressure from a pressure source 4 to engage or disengage various transmission ratios, and with several electric actors 7, 8 of a hydraulic system of the transmission unit 3 for adjustment of actuating pressures for the shift elements 5, 6.

Fundamentally, the transmission device 3 can be any automated manual shift or automatic transmission known from general practice, which incorporates at least one hydraulically controlled shift element, in this example having two hydraulically controlled shift elements 5, 6 such as frictional disk clutches or disk brakes.

To optimize the fuel consumption of the vehicle 1 and reduce its pollutant emissions, a so-called engine start-stop function is provided by way of which the combustion engine 2 is switched off, under predefined operating conditions of the vehicle 1, and is re-started again when one or more predefined start criteria are satisfied.

For example, the combustion engine 2 is switched off when the brake light is activated with the vehicle at rest and/or when the driver actuates the brake the brake pedal of the vehicle's working brake system even when the vehicle is very briefly at rest when the selector lever is in position "D" for driving forward, and is re-started again when various start criteria are satisfied, for example, if the brake pressure falls below a certain threshold, if the vehicle's brakes are released, if the brake light is deactivated, if the driver moves the selector lever to a position where starting the combustion engine 2 is called for, if the accelerator pedal is actuated by more or less than a threshold amount, if the control system gives notice of an engine start process, if the drive output speed is above or below a threshold value, if there is a predefined charge balance of an electric accumulator of the vehicle, or as a function of comfort criteria, such as a need to air-condition the passenger compartment.

Furthermore, in the present case the transmission device 3 has a hydraulic system (not shown in detail in the drawing), an oil sump 9 and a hydraulic storage device 10 for storing hydraulic fluid of the hydraulic system of the transmission system 3.

The hydraulic storage device associated with the transmission unit 3 corresponds to a device for storing hydraulic fluid of a hydraulic system of a transmission device described in DE 10 2006 014 756.1, and is operated in accordance with the method also proposed therein.

Figure 2:
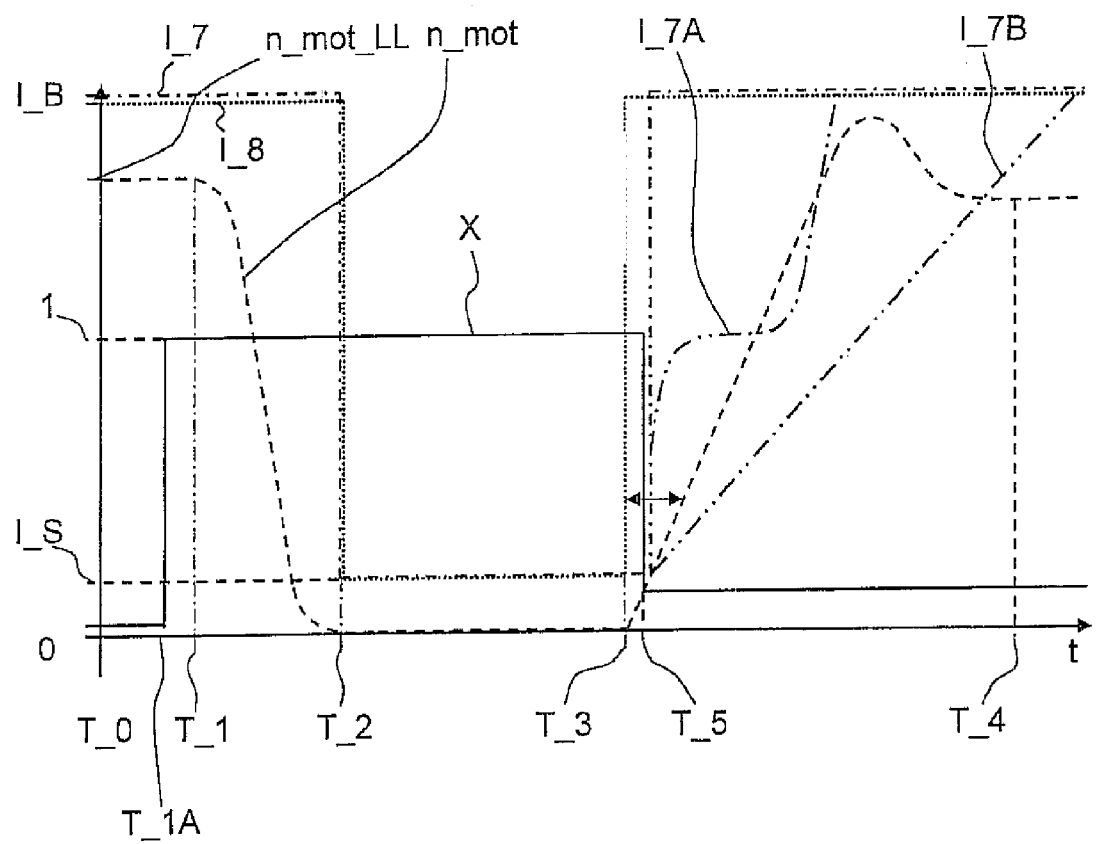
FIG. 2 is several time variations of various operating condition parameters of the drivetrain of the vehicle represented in FIG. 1.

When the engine start-stop function calls for the combustion engine 2 to be switched off, then in the manner indicated in FIG. 2 as a function of time, the energizing current of the actors 7 and 8 is adjusted from an operating level I_B, in which the actors 7 and 8 are each energized with a current corresponding to an operating-condition-dependent actuation pressure of the shift elements 7 and 8, to a standby level I_S and, when the engine start-stop function calls for the combustion engine 2 to be switched on, the energizing current of the actors 7 and 8 is restored again from the standby level I_S to the operating level I_B.

At a time T_0 the vehicle 1 made with the transmission unit 3 is nearly at rest and the combustion engine is running at a speed n_mot that corresponds essentially to an idling speed n_mot_LL. At a time T_1, the combustion engine 2 is switched off by the engine start-stop function and the engine speed n_mot falls from the idling speed n_mot_LL until, at a time T_2, it is essentially zero.

The engine start-stop function's call to switch off the combustion engine 2 occurs earlier than time T_1 and also ensures that the hydraulic storage device 10 associated with the transmission unit 3 is completely full and, in its completely full condition, arrested and held by a holding device, the status of the hydraulic storage device 10 or the holding device that holds it in its completely full condition being indicated by the variation line X which has the value zero, between time T_0 and a time T_1A earlier than time T_1.

The zero value of the variation X characterizes an operating condition of the hydraulic storage device 10 in which it is not completely full or not held by the holding device in its completely full state. At time T_1A, the holding device changes to a condition in which it is holding the completely filled hydraulic storage device 10, and the variation line X then jumps to a value 1.

The variation lines I_7 and I_8 of the energizing current values of the actors 7 and 8 of the transmission 3 are, in this case, abruptly reduced at time T_2 from the operating level I_B to the standby level I_S, in order to relieve an on-board electric supply system of the vehicle 1 in a simple manner. Since they are energized to the standby level, at time T_2 the actors 7 and 8 are in a condition in which various diagnosis functions in the transmission 3, known from a common practice, can be carried out in order to monitor various transmission functions.

At a time T_3, the combustion engine 2 is re-started by the engine start-stop function so that, as shown in FIG. 2, the engine speed n_mot increases and, at a time T_4, again reaches the speed n_mot_LL. At the same time, the energizing current of the actor 8 is increased abruptly at time T_3 from the standby level I_S to the operating level I_B, so that at time T_3 the actor 8 is energized with the current required to produce a called-for condition of the transmission unit and when the hydraulic system is delivering sufficient pressure, the shift element 5 or the shift element 6 is acted upon by the actuation pressure needed for the operating condition of the transmission unit 3.

In the present case, the actor 7 is only raised from the standby level I_S to the operating level I_B at a time T_5 later than time T_3, so that the actor 7 is energized with the current required to produce a called-for operating condition of the transmission device 3 later than is the actor 8, the shift element 5 or the shift element 6 then being acted upon by the actuation pressure that corresponds to the operating level.

In addition, the arrest of the hydraulic storage device 10 by the holding device is released close to the time T_3 when the combustion engine 2 is switched on, and to increase the spontaneity of the vehicle 1, the volume of hydraulic fluid stored in the hydraulic storage device 10 is in a known way fed into the hydraulic system of the transmission unit 3 so that an appropriate pressure level is produced in the hydraulic system even before the speed of the combustion engine 2 has been reached which is necessary for the supply of sufficient pressure by the hydraulic pump.

Owing to the time offset between the energizing current change of the actors 7 and 8 from standby level I_S to operating level I_B, the shift element 5 or 6 controlled by the actor 8 reaches its transmission capacity required to produce the called-for operating condition of the transmission device 3 earlier than does the shift element 6 or 5 controlled by the actor 7. This ensures, in a simple manner, that rotating masses of the transmission 3 that are to be engaged in the force flow of the drivetrain of the vehicle 1 are accelerated by the shift element 5 or 6 first, and then synchronized by the shift element 6 or 5 engaged later by the actor 8, without producing undefined speed conditions in the transmission system.

To obtain particularly harmonious engagement conditions in the transmission unit 3, in further advantageous variants of the method according to the invention, the energizing current of at least one actor is changed between the standby level and the operating level in a modulated way indicated by the curve shapes I_7A and I_7B, and the transmission capacity of the shift element 5 or 6 controlled by the actor 7 is increased in such a manner that the process of engaging the shift element 5 or 6 produces no torque fluctuations in the drivetrain of the vehicle 1 or in the drive output zone thereof that are noticeable by the driver or which compromise driving comfort.

The time interval between the energizing current changes of the various actors of a transmission unit is chosen, among other things, as a function of the filling flow resistance in the hydraulic system of the transmission unit 3 and the respective clutch volumes of the shift elements 5 and 6 to be filled, to give the most favourable possible sequence of engagement times of the shift elements to be engaged for the production of a called-for operating condition of the transmission unit 3.

Other actors, which are not involved in the generation of a called for operating condition of the transmission device, are also changed from their standby level I_S to their operating level before releasing the arresting or holding device and consequently feeding the oil stored in the hydraulic fluid volume of the hydraulic storage device into the hydraulic system of the transmission device. The operating level of the energizing current of such actors is essentially zero when the actors are made as decreasing pressure regulators and are pressurized when in the de-energized condition. In a simple manner, this avoids inadvertent filling of shift elements controlled by such actors.

REFERENCE NUMERALS 1 vehicle
2 combustion engine
3 transmission device
4 pressure source
5 shift element
6 shift element
7 actor
8 actor
9 oil sump
10 hydraulic storage device
t time
T_0 to T_5 specific time points
I_B operating level
I_S readiness level
n_mot engine speed
n_mot_LL idling engine speed
X variation curve
I_7 variation curve
I_8 variation curve
I_7A variation curve
I_7B variation curve

The invention claimed is:

1. A method of operation of a transmission device (3) having a plurality of shift elements (5, 6) which are hydraulically actuated, via a pressure source (4), for engaging and disengaging various transmission ratios of the transmission device (3), a hydraulic system of the transmission device (3) having a respective electric actor (7, 8) for adjustment of actuating pressures of the respective shift element (5, 6) such that when an engine start-stop function calls for a combustion engine (2), forming part of a drivetrain with the transmission device (3), to be switched off, an energizing current of the actors (7, 8) is adjusted from an operating level (I_B), at which the respective actor (7, 8) is energized with a current appropriate for producing an operating-situation-dependent actuation pressure in the respective shift element (5, 6), to a lower standby level (I_S), and when the engine start-stop function calls for the combustion engine (2) to be switched on, the energizing current of the actors (7, 8) is adjusted from the standby level (I_S) to the operating level (I_B), the method comprising the step of:

changing the energizing currents of the actors (7, 8), from the standby level (I_S) to the operating level (I_B), in a defined time sequence.

2. The method according to claim 1, further comprising the step of controlling acceleration of rotating masses in the transmission device (3), brought about by the defined changing of the energizing current in the actors (7, 8) from the standby level (I_S) to the operating level (I_B), to occur in a mutually co-ordinated manner.

3. The method according to claim 1, further comprising the step of changing the energizing current of at least one actor (7) in a modulated manner.

4. The method according to claim 3, further comprising the step of changing the energizing current of at least one actor (7) in the modulated manner as a function of at least one event.

5. The method according to claim 1, further comprising the step of, when the starting of the combustion engine (2) is desired, introducing a stored hydraulic fluid volume into the hydraulic system, via a hydraulic storage device (10) connected to the hydraulic system, at an operating-situation-dependent time point which is one of before, at or after a time when the combustion engine (2) is switched on.

6. The method according to claim 5, further comprising the step of the energizing current of actors which, when the combustion engine (2) is switched on, pressurize respectively associated shift elements in order to produce a particular operating condition of the transmission device (3), and the energizing current of these actors is changed from the standby level (I_S) to the operating level (I_B) before the time when the hydraulic fluid volume is fed from the hydraulic storage device (10) into the hydraulic system.

* * * * *